United States Patent Office 3,415,779
Patented Dec. 10, 1968

3,415,779
THERMOCURABLE PRECONDENSATES FROM POLYEPOXY COMPOUNDS AND AROMATIC AMINES AND PROCESS FOR THEIR MANUFACTURE
Erich Preininger, Riehen, and Gustav Ott, Arlesheim, Switzerland, assignors to Ciba Limited, Basel, Switzerland, a Swiss company
No Drawing. Filed Nov. 12, 1964, Ser. No. 410,702
Claims priority, application Switzerland, Dec. 13, 1963, 15,307/63
9 Claims. (Cl. 260—47)

ABSTRACT OF THE DISCLOSURE

Thermocurable precondensates are obtained by the reaction of a 1,2-epoxy compound having a 1,2-epoxy equivalency greater than one with a member selected from the group consisting of a phosphoric acid ester containing at least one member of the group consisting of aminoaryloxy group linked with phosphorus and aminoaryl group linked with phosphorus, at least one primary amino group being bound to an aryl radical and a phosphonic acid ester containing at least one member of the group consisting of aminoaryloxy group linked with phosphorus acid aminoaryl group linked with phosphorus, at least one primary amino group being bound to an aryl radical, at a temperature of at least 30 while preventing gelling.

Thermocurable precondensates from epoxy resins and curing agents, for example aromatic amines, are known. Their use offers considerable advantages in various industrial spheres, for example in the manufacture of moulding compositions and sinter powders, over the use of simple mixtures of epoxy resins with curing agents. When using mixtures of epoxy resins and curing agents such as phenol resins, dicyandiamide, aromatic amines or pyromellitic anhydride, as fluidised bed sinter powders, for example as described in British Patent 888,207, published Jan. 31, 1962, or 904,397, published Aug. 29, 1962, there arises the serious disadvantage that a demixing occurs quickly in the fluidised sintering bed so that the production of homogeneous coatings having uniformly good mechanical properties is not ensured. To remedy this disadvantage it was proposed in German Auslegeschrift 1,127,257 of Mannesmann Aktiengesellschaft, Dusseldorf, Germany of Apr. 5, 1962, to produce protective coatings by spraying the heated surfaces of metallic bodies with pulverulent precondensates of epoxy resins with curing agents, for example amine curing agents. The use of such precondensates as sinter powders does overcome the inconveniences associated with the use of mixtures of epoxy resins with curing agents, since the particles are of uniform composition so that, during the application of the sinter powder, for example in the fluidised bed method or by electrostatic spraying, no demixing can be caused by the different specific gravities of the components, but the hitherto known precondensates of epoxy resins with amines display certain disadvantages which in the past have prevented their use especially as sinter powder. Precondensates prepared from epoxy resin liquid at room temperature and diaminodiaryl alkanes, such as 4,4-diaminodiphenylmethane, have been described, for example, in German Patent No. 1,061,067, granted May 18, 1961, to Ciba Aktiengesellschaft, Basel, Switzerland, where they are used for the manufacture of moulding compositions. Such precondensates have, however, only a restricted shelf life; progressive cross-linking raises their melting point so that after only a few week's storage such products become unsuitable for the formation of good coatings by the sinter method. However, the low-molecular liquid epoxy resins, from which these known precondensates are derived, are less suitable for surface protection purposes than the high-molecular, fusible epoxy resins that are solid at room temperature.

The manufacture of precondensates from epoxy resins that are solid at room temperature and the aromatic amines known as curing agents, such as 4,4'-diaminodiphenylmethane causes difficulties because of the relatively considerable reactivity of such amines, as the precondensate must be formed at an elevated temperature, or above the melting temperature of the epoxy resin. Likewise, the incorporation of pigments and fillers must be carried out at a temperature above the melting point of the epoxy resin. More especially in the case of large batches of an industrial scale it becomes extremely difficult to prevent the premature gelling with these operations.

While in the case of experiments (not described in literature) using small batches it has been possible to prepare thermocurable precondensates from solid epoxy resins and aromatic diamines, such as 4,4'-diaminodiphenylmethane, and so test their suitability as sinter powders; the coatings obtained by the fluidised bed sintering method did have a good resistance to chemicals, but their flexibility was inadequate for practical purposes. In addition to this disadvantage there is the difficulty of controlling the precondensation, as well as the stability of the precondensate which does not satisfy more stringent requirements.

Surprisingly, it has now been found that thermocurable epoxy resin+curing agent precondensates are obtained that do not display the above-mentioned disadvantages of the known precondensates and are suitable for the manufacture of sinter powders, when an epoxy resin, preferably a fusible epoxy resin that is solid at room temperature, is reacted with certain aminoaryl phosphates or phosphates at an elevated temperature while preventing the gelling.

There are suitable aminoaryl phosphates that contain at least one primary amino, or preferably two such groups, linked with aryl radicals.

Accordingly, the present invention provides a process for the manufacture of thermocurable precondensates from polyepoxy compounds and aromatic amines, that are particularly suitable for the manufacture of sinter powders. In the present process an epoxy compound having an epoxide equivalence greater than 1, especially a fusible polyglycidyl ether of a polyphenol or polyalcohol, or a polyglycidyl ester of a polycarboxylic acid, said ester being solid at room temperature, is reacted with a phosphoric acid ester or phosphonic acid ester containing at least one aminoaryloxy group or aminoaryl group linked with phosphorus, said ester containing at least one, preferably at least two, primary amino groups linked with aryl radicals, by heating at a temperature of at least 30° C., preferably at a temperature from 30° C. to 120° C., while preventing gelling, to form a fusible and thermocurable adduct that is solid at room temperature.

The epoxy compounds to be used in the present process have an epoxide equivalence greater than 1, that is to say they contain $x$ epoxide groups calculated on the average molecular weight, $x$ being a whole or fractional number greater than 1.

As is known, the conventional methods for the manufacture of polyepoxy compounds yield in general commercial mixtures of compounds having dissimilar molecular weights and further containing a share of compounds whose terminal epoxide groups have undergone partial hydrolysis. The analytically determined value for the epoxide equivalence of such commercial mixtures need not be an integer, at least 2, but in every case it must be greater than 1.0.

Particularly suitable epoxy compounds of the kind defined above are compounds whose molecule contains more than one glycidyl group. As relevant examples there may be mentioned basic polyepoxy compounds such as are obtained when a primary or secondary aliphatic or aromatic diamine—such as aniline, toluidine, 4,4'-diaminodiphenylmethane, 4,4'-di(mono-methylamino)diphenylmethane or 4,4'-diaminodiphenylsulphone—is reacted with epichlorohydrin in the presence of alkali.

Further suitable are polyglycidyl esters accessible by reacting a dicarboxylic acid with epichlorohydrin or dichlorohydrin in the presence of alkali. Such polyesters may be derived from aliphatic dicarboxylic acids, such as succinic acid or adipic acid or especially an aromatic dicarboxylic acid, such as phthalic or terephthalic acid. As relevant examples there may be mentioned diglycidyl adipate and diglycidyl phthalate.

Preferred use is made of polyglycidyl ethers, such as are obtained by etherifying a dihydric or polyhydric alcohol, or diphenol or polyphenol, with epichlorohydrin or dichlorohydrin in the presence of alkali. These compounds may be derived from glycols, such as ethyleneglycol, diethyleneglycol, triethyleneglycol, 1,3-propyleneglycol, 1,4-butyleneglycol, 1,5-pentanediol, 1,6-hexanediol, 2,4,6-hexanetriol, glycerol, N-aryldialkanolamines, such as N-phenyldiethanolamine, N-phenyl-di-2-propanolamine, N-(ortho-tolyl)diethanolamine and especially from diphenols or polyphenols, such as resorcinol, pyrocatechol, hydroquinone, 1,4 - dihydronaphthalene, phenol - formaldehyde condensation products of the resol or novolak type, bis(parahydroxyphenyl)methane, bis(para-hydroxyphenyl) methylphenylmethane, bis(para - hydroxyphenyl)tolylmethane, 4,4'-dihydroxydiphenyl, bis(para-hydroxyphenyl)sulphone and especially bis(para-hydroxyphenyl)dimethylmethane.

Particularly suitable are epoxy resins that are solid at room temperature, for example those obtained by reacting epichlorohydrin with bis(para-hydroxyphenyl)dimethylmethane (Bisphenol A) in the presence of alkali and which contain about 1.9 to 0.25 epoxide equivalents per kg. Such epoxy resins correspond, for example, to the average formula

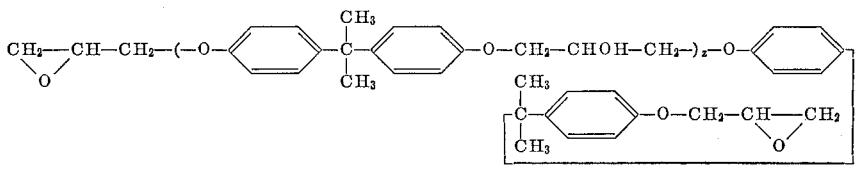

where $z$ is a whole or fractional small number from 2 to 12. Their melting (or softening) points are within the range from about 65° to 155° C. For certain uses there are also suitable the epoxy resins that are liquid at room temperature, for example the polyglycidyl ethers of Bisphenol A containing 3.8 to 5.8 epoxide equivalents per kg.

Furthermore, there may be used epoxy resins esterified with carboxylic acids, that have a residual content of free epoxy groups. Esterifying carboxylic acids suitable for this purpose are higher fatty acids, especially unsaturated fatty acids from drying oils, such as linseed oil fatty acid or resin acids and polycarboxylic acids such as sebacic acid, phthalic acid, citric acid or the like.

It is also possible to use a mixture of two or more of the above-mentioned epoxy resins.

As aminoaryl phosphates containing at least one primary amino group to be used for the manufacture of the new precondensates there are suitable, for example, aminoaryl phosphates of the formula (I) 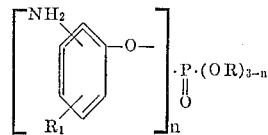

where the residues R are identical or different aryl radicals, $R_1$ represents a hydrogen atom or an alkyl radical and $n=1$, 2 or 3.

As examples of such aminoaryl phosphates of the Formula I there may be mentioned:

Tris(4-aminophenyl)phosphate, 4,4'-diamino-triphenyl phosphate, 4-tertiary butyl-4',4''-diamino-triphenyl phosphate, 3,3'-diamino-3''-N-dimethylamino-triphenyl phosphate, bis(4-aminophenyl)bisphenylyl phosphate, 3-ethylamino-4-methyl-4',4''-diamino-triphenyl phosphate and bis(4-aminophenyl)-+2-naphthyl phosphate.

Further suitable are, for example, aminoaryl phosphates of the formula (II) 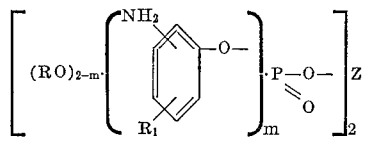

where the residues R are identical or different aryl radicals, Z represents a divalent aromatic, mononuclear or polynuclear residue, for example a residue of the formula

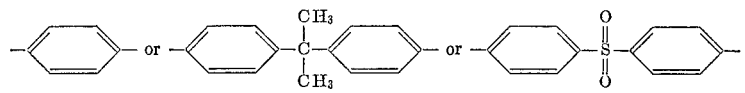

$R_1$ stands for a hydrogen atom or an alkyl radical and $m=1$ or 2.

As an example of an aminoaryl phosphate of the Formula II there may be mentioned the compound of the formula

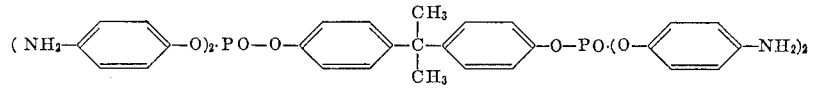

Further suitable are, for example, aminoaryl phosphonates of the formula

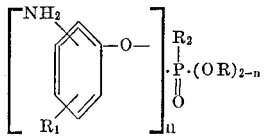

where the residues R are identical or different aryl radicals, $R_1$ represents a hydrogen atom or an alkyl radical, $R_2$ an aryl or aralkyl radical and $n=1$ or 2. As an example there may be mentioned bis(4-aminophenyl)benzyl phosphonate.

Instead of using aminoaryl phosphates or phosphonates of the Formulae I to III as starting materials for the manufacture of the precondensates of this invention there may be used derivatives of compounds in which some of the amino groups have been converted into amide groups, imide groups, N-hydroxyalkyl groups or the like, by reaction with reactive compounds, such, for example, as acid anhydrides or alkylene oxides. Such derivatives must, however, always have a residual content of at least one primary amine group. Therefore, these derivatives can be prepared only from those aminoaryl phosphates or phosphonates of the Formulae I to III which contain at least two, or preferably at least three, primary amino groups.

The aminoaryl phosphates are in general used in an amount such that there are 0.2, preferably 0.75 to 1.25, active amine hydrogen atoms available for every equivalent of epoxide groups of the polyepoxy compound.

When polyepoxy compounds are used that are solid at room temperature, the precondensates are generally obtained by simply melting the epoxy resin together with the aminoaryl phosphate until a homogeneous solution has formed, whereupon the melt is heated, for example at a temperature ranging from 80° C. to 120° C. The heat treatment can be performed in the presence of additives, such as fillers and/or pigments and/or thixotropizing agents. The temperature and time used for the heat treatment depend, inter alia, on the kind of epoxy resin and aminoaryl phosphate used, on their molar ratio, and on the presence of fillers. When the heat treatment is carried out for too long or at too high a temperature, the melt may be directly transformed into the infusible, gelatinous state. Timely discontinuation of the reaction can be achieved by rapid cooling to room temperature or at least to a temperature below 40° to 50° C., for example by pouring the melt in a thin layer over sheet metal. The solidified melt can then be powdered, for example in a hammer mill. The resulting precondensates have an excellent shelf life which, for example, in a short-time test was found to be better than 1000 hours at 50° C. This good thermostability makes it possible to incorporate subsequently additives, such as pigments and fillers, at an elevated temperature. A particularly good stability is found with precondensates derived from aminoaryl phosphates or phosphonates that contain in addition to at least one primary amino group also at least one amide or imide group.

When epoxy resins liquid at room temperature are used, which are in general more reactive than the solid epoxy resins, special care is needed to prevent the condensation from going on until the product has gelled and become infusible. The aminoaryl phosphate is dissolved in the liquid epoxy resin advantageously at room temperature or with heating for a minimum time until a completely homogeneous solution has been obtained which is then rapidly cooled. The heat treatment of the resulting solution is advantageously performed at a temperature ranging from 25° to 50° C. until the product has become fusible and is solid at room temperature. The shelf life of such precondensates is, however, in general less good than that of precondnsates derived from solid epoxy resins.

The epoxy resin+curing agent precondensates obtained by the present process can be transformed without needing an additive by being simply heated at elevated temperatures, for example at 150° to 180° C., at a great speed into cured moulding compositions or coatings having excellent mechanical properties.

The new precondensates prepared from epoxy resins that are solid at room temperature are particularly suitable for the manufacture of sinter powders for surface protection. To form a protective coating the sinter powder is applied to the surface to be protected, for example a metal surface, and then melted by being heated and at the same time cured to form a continuous layer. In the known fluidised bed sintering process, for example, a preheated metal object is immersed in a closed container and moved about in it, a large amount of sinter powder being kept moving about in the container like a liquid by means of a current of gas. During this operation the metal object transfers its heat to the sinter powder surrounding it and causes the latter to melt and undergo curing. According to another method the sinter powder is sprayed in the cold state over the heated metal surface to be protected in the ordinary atmosphere with the aid of a suitable spraygun, if necesary or desired with the use of an electrostatic field. To ensure good film properties the sprayed object is then generally cured, for example at 180° C.

The coatings produced in the manner described above possess considerable flexibility and surface hardness and are not affected by deforming impacts. Furthermore, they have a high gloss, good stability towards chemicals, little abrasion losses and they adhere firmly.

The new precondensates of the invention may also be used in any other industrial sphere where thermocurable resin precondensates are employed, such as for the manufacture of laminating resins, adhesives and especially moulding compositions. Particularly suitable for the latter purpose are precondensates derived from epoxy resins that are liquid at room temperature.

For the manufacture of sinter powders or moulding compositions ready for use the resin component is further admixed with fillers and/or pigments and/or thixotropizing agents. As fillers for sinter powders there are suitable finely dispersed substances, such as titanium dioxide (rutile modification) or silica powder. A suitable thixotropizing agent is, for example, the finely divided silica having a large inner surface, marketed under the registered trade name Aerosil.

As fillers for moulding compositions there are suitable fibrous or powdered fillers, such as asbestos, glass fibres, mica, ground chalk, kaolin, quartz meal, metal powders or metal oxides. In addition to fillers there may be further added dyestuffs, stabilisers, plasticisers, mould lubricants and other modifying substances. These aforementioned substances may, if desired, be added to the solution or melt of the aminoaryl phosphate in the epoxy resin before proceeding to the manufacture of the precondensate. In suitable mixers, for example roller mixers or kneaders, the dissolution or melting of the amine with the epoxy resin may be performed simultaneously with the admixing of the filler. If desired, the precondensates may also be formed in situ on other substrates, for example glass fibre fabrics, whereupon so-called "prepregs" are obtained which have a good shelf life and can be pressed with heating and shaping to form laminates.

Alternatively, the filler and other additives may be incorporated in the precondensed solid product resulting from the heat treatment, for example by grinding in a ball mill.

Percentages in the following examples are by weight.

The precondensates of the invention described in the examples were manufactured from the following aminoaryl phosphates of phosphonates:

Product I.—Tris(4-aminophenyl)phosphate

The apparatus used for the reaction comprised a three-neck sulphonating flask equipped with agitator, thermometer, closable nitrogen inlet tube, distillation head, descending air condenser wit han extension for exchanging the receptable under vacuum (Anschuetz-Thiele extension), oilbath and was adapted for connecting a water-jet pump or a rotary slide valve pump.

By heating 326 g. (1.0 mol) of triphenyl phosphate, 327 g. (3.0 mols) of 4-aminophenol and 1.0 g. of a sodium hydride dispersion in mineral oil (47% sodium hydride) a melt was prepared under nitrogen by heating in an oilbath maintained at 165° C., which melt still contained a large proportion of suspended 4-aminophenol. By reducing the pressure to 15 to 16 mm. Hg the phenol formed by the reaction was caused to pass over, during which the temperature of the reaction mixture rose from an initial value of 123° to 159° C. Within 2 hours and 35 minutes 237.4 g. (2.53 mols) of phenol were distilled off. After a total reaction time of 3 hours and 50 minutes (during the last 30 minutes the distillation was performed at 172° C. under 0.4 mm. Hg pressure), a total of 263.9 g. (2.81 mols) of phenol was removed.

On solidification the melt was crystalline; it was disintegrated and dissolved in a mixture of 150 g. to 30% hydrochloric acid and 400 ml. of water, mixed with 3 g. of active carbon and filtered. While cooling with ice, scavenging with nitrogen and stirring vigorously, a solution of 250 g. of NaOH in 500 g. of water was dropped in, which caused the reaction product to precipitate. The strongly alkaline mother liquor contained the unreacted 4-amino-phenol.

The substance which had settled out in crystalline form was suctioned off and rinsed with deionized water until no more chlorine ions could be identified in the filtrate. After drying for 17 hours at 70° C. under 20 mm. Hg pressure, there were obtained 253 g. (=a yield of 68.2% referred to triphenyl phosphate) of colorless crystals melting at 152° to 155° C.

The resulting product consists of tris(4-amino-phenyl) phosphate of the formula

The analytically pure product was obtained by drying for another 6 hours at 78° C. under 0.2 mm. Hg pressure over phosphorus pentoxide; it melted at 153° to 155° C.

$C_{18}H_{18}O_4N_3P$ calculated: C, 58.22; H, 4.89; N, 11.32%. Found: C, 58.05; H, 4.95; N, 11.07%. Molecular weight: 371.33.

Product II.—4,4'-diamino-triphenyl phosphate

A melt was prepared under nitrogen, in the apparatus used for making Product I, from 326.2 g. (1.0 mol) of triphenyl phosphate, 219.3 g. (2.0 mols) of 4-aminophenol and 1.0 g. of a sodium hydride dispersion in mineral oil (47% sodium hydride).

In the course of 4 hours the temperature of the reaction mixture was gradually raised from 138° to 152° C., while maintaining the pressure at 16 to 19 mm. Hg. During the last 20 minutes the distillation of the phenol formed in the reaction was completed by reducing the pressure to 0.25 mm. Hg. Total of phenol removed by distillation: 183.9 g. (1.96 mols).

The crystalline reaction product was dissolved in a mixture of 250 ml. of 30% hydrochloric acid and 800 ml. of water, treated with active carbon and filtered. When the clear, light-colored solution was cooled with ice and vigorously scavenged with nitrogen and 1 kg. of 25% NaOH was dropped in, a colorless, crystalline precipitate was obtained which was washed with 6×500 ml. of water and dried for 16 hours at 70° C. under 20 mm. Hg pressure. Yield: 305.2 g. (=85.8% referred to triphenyl phosphate). Melting point: 118° to 123° C. Amine content: 5.5 equivalents of $NH_2$ groups per kg. Calculated: 5.62 moles per kg.

The resulting product consists substantially of 4,4'-diamino-triphenyl phosphate of the formula

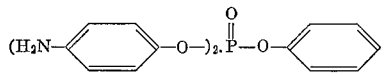

Product III.—Bis(4-aminophenyl)benzyl phosphonate 68.1 g. (0.21 mol) of the diphenyl ester of benzylphosphonic acid were melted with 48.0 g. (0.44 mol) of 4-aminophenol in the presence of 1.1 g. of a sodium hydride dispersion in mineral oil (47% sodium hydride) in the apparatus used for making Product I. The phenol formed and the bulk of the excess 4-aminophenol were distilled off under vacuum within 3 hours and 20 minutes at an oilbath temperature of 180° to 200° C.

The crude product obtained as the residue was dissolved in a mixture of 50 ml. 37% hydrochloric acid and 150 ml. of water, treated with active carbon and filtered. The clear, dark solution was slowly stirred dropwise into a solution of 50 g. NaOH in 1200 ml. of water, and the crystalline precipitate was suctioned off, washed until it was free from salt and precipitated once more in the identical manner.

A colorless, crystalline substance was obtained in a yield of 15.0 g.; for analytical purpose it was reprecipitated from chloroform with ether and dried over phosphorus pentoxide for 3 hours at 78° C. under 30 mm. Hg pressure, whereupon the product melted at 137° to 143° C.

Nitrogen analysis.—Calculated for $C_{19}H_{19}O_3N_2P$: 7.91%. Found: 8.1%.

The resulting product consists of bis(4-aminophenyl) benzyl phosphonate of the formula

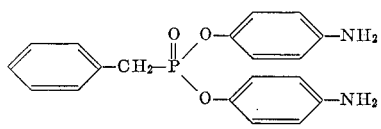

Product IV.—Imide from about 1 mol of hexahydrophthalic acid anhydride and 1 mol of tris(4-aminophenyl) phosphate 834 g. (2.25 mols) of tris(4-aminophenyl)phosphate [=Product I] and 328.5 g. (2.14 mols) of hexahydrophthalic anyhdride were melted under nitrogen by being heated at 145° C. in a distillation apparatus. In the course of 55 minutes the temperature of the reaction mixture was gradually raised to 205° C. and the eliminated water was distilled off under nitrogen.

There were obtained 1115 g. of an amorphous reaction product melting at 60° C. and containing 3.78 equivalents of $NH_2$ groups per kg., consisting predominantly of the compound of the formula

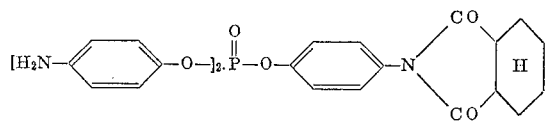

Product V.—Adduct from about 2 mols of propylene oxide with 1 mol of tris(4-aminophenyl)phosphate 100 g. (0.27 mol) of tris(4-aminophenyl)phosphate [=Product I] were melted under nitrogen in an apparatus provided with agitator and reflux condenser through whose water jacket a brine cooled at 0° to −5° C. was circulated. At an oilbath temperature of 160° C. 34.8 g. (0.60 mol) of propylene oxide were dropped in at a rate such that at any time the regular was little. This took about 3 hours. After another 35 minutes no condensate formed in the condenser, and the propylene oxide added had been completely reacted.

The crude reaction product was slightly tacky at room temperature, had an amine content of 5.99 equivalents of amino groups per kg. and contained 3.74 equivalents of hydroxyl groups per kg. It consists predominantly of the compound of the formula

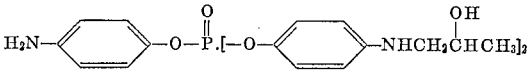

EXAMPLE 1

80 g. of a polyglycidyl ether which is solid at room temperature [prepared by condensing 2,2-bis(para-hydroxyphenyl)propane in the presence of aqueous sodium hydroxide solution] containing 2.1 epoxide equivalents per kg. and melting at about 50° C., were melted together with 11 g. of tris(4-aminophenyl)phosphate [=Product I] at 80° C. and the melt was thoroughly stirred for 3 minutes. Without being further stirred, the melt was heated in an oilbath at 80° C. and specimens were taken and subjected to a melting point test.

After 5 minutes heating the melting point was 71° C., as measured on a Kofler heatingtench. The product contained 1.48 epoxide equivalents per kg., which is 80% of the initial value.

After 20 minutes heating the melting point had risen to 85° C. and the epoxide content had dropped to 1.27 epoxide equivalents per kg., e.g., 69% of the initial value.

At this stage the oilbath was removed, the precondensate rapidly cooled to 50° C. by immersion in cold water and subjected to a further heat treatment at 50° C. After 14 hours the melting point was 104° C. and the precondensate contained 1.04 epoxide equivalents per kg.

EXAMPLE 2

70 g. of the polyglycidyl ether used in Example 1, 20 parts of titanium dioxide (rutile modification) and 3.5 g. of finely divided silica having a large inner surface (marketed under the registered trademark Aerosil) were ground at 125° to 140° C. on a three-roller mill. This melt was mixed at 120° C. with 40 g. of a polyglycidyl ether [prepared by condensing 2,2 - bis(para - hydroxyphenyl)propane with epichlorohydrin in the presence of aqueous sodium hydroxide solution] containing 1.1 epoxide equivalents per kg. and melting from 70° to 80° C., and the whole was intimately mixed. Finally, 17 g. of Product II, obtained by transesterification of triphenyl phosphate with 2 mols of 4-aminophenol, consisting predominantly of 4,4'-diamino-triphenyl phosphate and containing 5.5 equivalents of amino groups per kg. and melting at 118° to 123° C. were stirred in. To form a precondensate, the batch was further stirred for 10 to 15 minutes at 120° C. and the melt was then poured over sheet aluminum to form a layer 5 to 10 mm. thick. The cooled product was then ground in a rod mill and graded by sifting to a particle size from 100 to 150$\mu$. The resulting precondensate containing a filler turned plastic at 74° to 77° C., measured on a Kofler heater.

It can be used as it is for making coatings by the fluidised bed sintering method in the following manner:

Sand-blasted iron sheets measuring 1 x 70 x 150 mm., preheated at 180° C., were coated with the precondensate powder by the fluidized bed sintering method, and the coating was cured by being heated for 20 minutes at 180° C. A coating of 420$\mu$ prepared in this manner displayed a Persoz pendulum hardness of 360 seconds and an Erichsen deep-drawing value (DIN 53 156) of 5.7 mm. The coatings were further subjected to the test with the Niesen impact tester described in the book of Dr. Felix Wilborn, "Physikalische und technische Pruefverfahren fuer Lacke und ihre Rohstoffe," 1953, volume II, page 642.

The instrument is called "Schlagpruefgeraet fuer Lackschichten L 121" and is made by Messrs. Elektro-Physik of Cologne-Riehl.

In this test a ball of 20 mm. diameter, carrying a weight of 1 or 2 kg., is dropped from a variable, optional height on to the lacquer coat or on to the reverse of the coated metal sheet, whereby a spontaneous deformation of the metal sheet and of the lacquer coat is produced. Initially, a low dropping height and a small weight is used, and both are increased until the coat displays fissures. The test value to be recorded is the maximum of dropping height and weight at which the coat still remains intact. Result of the impact rest: 1 kg./90 cm.

The coatings are tested for their adhesion by bending a coated iron sheet over a straight edge in the course of 2 to 3 seconds uniformly through 90°. In this test it is found that coatings obtained by the fluidized bed sintering method always tear owing to the relatively great thickness of the layer so that these layers can be easily detached in the bend. In contrast thereto there appear in the contiguous, unstressed zone distinct differences in the detachability of the coatings which allow of an assessment of the adhesion to be made. In the case of coatings having a poor adhesion it is possible to insert a steel blade with little effort between the coating and the base and to detach large sections of the coating. In the case of coatings having good adhesiviy this is not possible; even with considerable effort, only small particles can be removed from the edges.

According to the testing method described above, the adhesion of the coating obtained in this example was good. Furthermore, the coating was not found to have been affected by being boiled for 6 hours in deionized water.

For comparison a precondensate was prepared from the epoxy resin used above and 4,4'-diaminodiphenylmethane and tested for its suitability for the production of coatings by the fluidized bed sintering method.

So far as was possible the precondensate was manufactured under the identical conditions as used for the manufacture of a precondensate described above with the use of 4,4'-diaminotriphenyl phosphate except that finally the 17 g. of 4,4'-diaminotriphenyl phosphate used there were replaced by 10 g. of 4,4'-diaminodiphenylmethane. Moreover, the melt had to be poured at 100° C. after 3 minutes in a thin layer on a sheet of aluminum cooled with water at 10° C., since otherwise complete crosslinking would have occurred and the epoxy resin would have turned insoluble and infusible. The softening point of the precondensate prepared in this manner was 110° to 115° C., measured on a Kofler heater.

In an identical manner as described sand-blasted iron sheets (1 x 70 x 150 mm.) were coated with this precondensate by the fluidized bed sintering method and then cured for 20 minutes at 180° C. The coatings obtained in this manner displayed a Persoz pendulum hardness of 270 seconds for a thickness of 300 to 400$\mu$ and an Erichsen deep-drawing value of 0.7 mm.

The result obtained by the impact ball test described above using the Niesen test gear was 1 kg./40 cm.

The adhesion, measured as described above, was good, but it was possible to detach individual particles within the area adjoining the bending zone appreciably more easily than was possible with the coating produced from the precondensate from epoxy resin and 4,4'-diaminotriphenyl phosphate.

The coating was not affected by being boiled for 6 hours in deionised water.

EXAMPLE 3

A precondensate was manufactured as described in Example 2, except that finally instead of the 17 g. of 4,4'-diaminotriphenyl phosphate used there, 25.2 g. of the imide from 1 mol of hexahydrophthalic anhydride and 1 mol of tris(4-aminophenyl)phosphate [=Product IV] were added, and the whole was stirred for 10 minutes at 120° C. The melt was poured over a sheet of aluminum in a thickness of 5 to 10 mm., allowed to cool and then as described in Example 2 ground to a particle size of 100 to 150$\mu$.

The softening point of the precondensate was 86° to 89° C., measured on a Kofler heater.

The precondensate had a good shelf life and when subjected to a short-time test after 1000 hours' storage at 50° C. it was still suitable for use as a fluidized bed sinter powder.

It was used for producing coatings by the fluidized bed sintering method in the following manner:

As described in Example 2, sand-blasted iron sheets (1 x 70 x 150 mm.) were coated with the precondensate by the fluidized bed sintering method and the coatings were cured for 20 minutes at 180° C. A coating obtained in this manner (270μ thick) displayed a Persoz pendulum hardness of 355 seconds and an Erichsen deep-drawing value of 0.9 mm. The adhesion of the coatings, measured by the test described in Example 2, was good. The coatings were not affected by being boiled for 6 hours in deionised water.

EXAMPLE 4

80 g. of a polyglycidyl ether solid at room temperature [prepared by condensing 2,2-bis(4-hydroxyphenyl)propane with epichlorohydrin in the presence of aqueous sodium hydroxide solution] containing 2.1 epoxide equivalents per kg. and melting at about 50° C., and 23 g. of the imide from 1 mol of hexahydrophthalic acid anhydride and 1 mol of tris(4-aminophenyl)phosphate [=Product IV] were melted together at 80° C. and then thoroughly stirred for 2 minutes. Without stirring the batch it was then further heated at 80° C. and every ten minutes a specimen was taken. No exothermic reaction was observed and the original melt solidified. After 10 minutes at 80° C. a specimen melted at 94° C.; the precondensate contained 1.0 epoxide equivalent per kg., that is 61% of the initial value.

This precondensate was readily soluble in a mixture of 5 parts of ethyleneglycol monoethyl ether and 1 part of n-butanol.

After 35 minutes at 80° C., a specimen melted at 120° C.; the condensation had already progressed to the point where the product was no longer completely soluble in the above-mentioned solvent mixture of ethyleneglycol monoethyl ether and n-butanol.

EXAMPLE 5

80 g. of the polyglycidyl ether used in Example 4 and 21.5 g. of an adduct from about 2 mols of propylene oxide with 1 mol of tris(4-aminophenyl)phosphate [=Product V] were melted together at 80° C. and thoroughly stirred for 5 minutes. Without being further stirred, the melt was then heated in an oilbath at 80° C., and at intervals specimens were taken and tested for their melting point and epoxide content.

After 40 minutes the melting point was found to be 85° C., and the product contained 1.05 epoxide equivalents per kg., that is 63% of the initial value.

After 80 minutes at 80° C., the melting point was 100° C., and the epoxide content was 0.80 epoxide equivalent per kg., that is 48% of the initial value.

This last-mentioned precondensate was quite stable on being stored. In a short-time test conducted at a storing temperature of 50° C., the melting point of the precondensate rose within 1000 hours to 126° C., and the product aged in this manner still melted completely and could be cured by heating at 180° C.

EXAMPLE 6

80 g. of a polyglycidyl ether which was liquid at room temperature and contained 5.2 epoxide equivalents per kg. [prepared by condensing 2,2-bis(para-hydroxyphenyl)propane with epichlorohydrin in the presence of aqueous sodium hydroxide solution] and 51.5 g. of the imide from 1 mol of hexahydrophthalic anhydride and 1 mol of tris(4-aminophenyl)phosphate [=Product IV] were intimately stirred for 5 minutes at 70° C. The resulting solution was cooled to 30° C. as rapidly as possible by being poured over an aluminum foil cooled with water to 10° C.

When the initially liquid mixture was further heated for 21 hours at 30° C., it turned into a solid precondensate melting at 60° C. After another 33 hours at 30° C. the melting point of the precondensate rose to 85° C. This precondensate was stable at room temperature for several weeks. When it was stored at 30° C., its melting point rose within 1000 hours further by about 15° C.

One part of this precondensate was powdered and sprinkled in a thin layer over an iron sheet. When the sheet thus treated was heated for a short time at 180° C., a film resulted that had good mechanical properties.

EXAMPLE 7

38.5 g. of bis(4-aminophenyl)benzyl phosphonate [=Product III] were dissolved in 80.0 g. of the polyglycidyl ether described in Example 6 which is liquid at room temperature, by stirring for 5 minutes at 70° C. As described in Example 6 the resulting solution was cooled to 30° C. as rapidly as possible and then subjected to a further heat treatment at 30° C. After 46 hours the initially liquid mixture had turned into a solid precondensate; after 390 hours at 30° C. the precondensate melted at 98° to 100° C. This precondensate was stable at room temperature and no longer altered its melting point substantially even when further stored for 600 hours at 30° C.

One part of the above precondensate was triturated and the resulting powder used to coat sheet iron as described in Example 6. After a short curing at 180° C. films having good mechanical properties were obtained.

What is claimed is:
1. A process for the manufacture of thermocurable precondensates from polyepoxy compounds and aromatic amines wherein a 1,2-epoxy compound having a 1,2-epoxy equivalency greater than 1 is reacted with a member selected from the group consisting of (a) a phosphoric acid ester of the formula

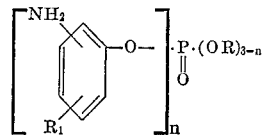

where the residues R are aryl radicals, $R_1$ represents a member selected from the group consisting of hydrogen atom and alkyl radical, and $n$ is an integer of at least 1 and at the most 3, (b) a phosphoric acid ester of the formula

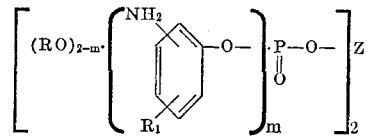

where the residues R are aryl radicals, Z represents a member selected from the group consisting of divalent aromatic radical and divalent araliphatic radicals, $R_1$ represents a member selected from the group consisting of hydrogen atom and alkyl radical, and $m$ is an integer of at least 1 and at the most 2, (c) a phosphonic acid ester of the formula

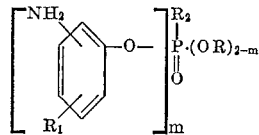

where the residues R are aryl radicals, $R_1$ represents a member of the group consisting of hydrogen atom and alkyl radical, $R_2$ is a member of the group consisting of aryl radical and aralkyl radical, and $m$ is an integer of at least 1 and at the most 2, and (d) a reaction product of any of phosphoric acid esters (a), (b) and (c) with a member selected from the group consisting of carboxylic acid anhydride and alkylene oxide, with the proviso that reaction product (d) must have a residual content of at least one free primary amino group.

2. A process as claimed in claim 1, when there is used as the 1,2-epoxy compound a fusible polyglycidyl ether, which is solid at room temperature, of a polyphenol.

3. A process as claimed in claim 2, wherein the 1,2-epoxy compound used is a fusible polyglycidyl ether (which is solid at room temperature) of 2,2-bis(para-hydroxyphenyl)propane containing 1.9 to 0.25 epoxide equivalents per kg.

4. A process as claimed in claim 1, wherein the 1,2-epoxy compound is reacted with a member selected from the group consisting of (a) a phosphoric acid ester of the formula

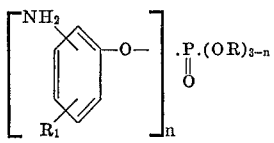

where the residues R are aryl radicals, $R_1$ represents a member selected from the group consisting of hydrogen atom and alkyl radical, and $n$ is an integer of at least 1 and at the most 3, and (b) a reaction product of a phosphoric acid ester (a) with a member of the group consisting of carboxylic acid anhydride and alkylene oxide, with the proviso that reaction product (b) must have a residual content of at least one free primary amino group.

5. A process as claimed in claim 4, wherein the 1,2-epoxy compound is reacted with the reaction product from 1 mol of hexahydrophthalic anhydride and 1 mol of tris(4-aminophenyl)phosphate.

6. A process as claimed in claim 1, wherein the 1,2-epoxy compound is reacted with a member selected from the group consisting of (a) a phosphoric acid ester of the formula

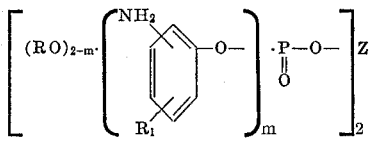

where the residues R are aryl radicals, Z represents a member selected from the group consisting of divalent aromatic radical and divalent araliphatic radicals, $R_1$ represents a member selected from the group consisting of hydrogen atom and alkyl radical, and $m$ is an integer of at least 1 and at the most 2 and (b) a reaction product of a phosphoric acid ester (a) with a member of the group consisting of carboxylic acid anhydride and alkylene oxide, with the proviso that reaction product (b) must have a residual content of at least one free primary amino group.

7. A process as claimed in claim 1, wherein the 1,2-epoxy compound is reacted with a member selected from the group consisting of (a) a phosphoric acid ester of the formula

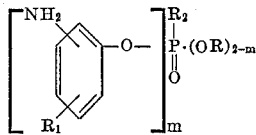

where the residues R are aryl radicals, $R_1$ represents a member of the group consisting of hydrogen atom and alkyl radical, $R_2$ is a member of the group consisting of aryl radical and aralkyl radical, and $m$ is an integer of at least 1 and at the most 2, and (b) a reaction product of a phosphoric acid ester (a) with a member selected from the group consisting of carboxylic acid anhydride and alkylene oxide, with the proviso that reaction product (b) must have a residual content of at least one free primary amino group.

8. A process as claimed in claim 1, wherein the precondensation reaction is carried out within the temperature range from 30° C. to 120° C.

9. New thermocurable precondensates which are obtained by reacting a 1,2-epoxy compound having a 1,2-epoxy equivalency greater than 1, with a member selected from the group consisting of (a) a phosphoric acid ester of the formula

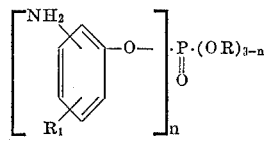

where the residues R are aryl radicals, $R_1$ represents a member selected from the group consisting of hydrogen atom and alkyl radical, and $n$ is an integer of at least 1 and at the most 3, (b) a phosphoric acid ester of the formula

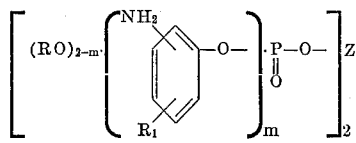

where the residues R are aryl radicals, Z represents a member selected from the group consisting of divalent aromatic radical and divalent araliphatic radicals, $R_1$ represents a member selected from the group consisting of hydrogen atom and alkyl radical, and $m$ is an integer of at least 1 and at the most 2, (c) a phosphoric acid ester of the formula

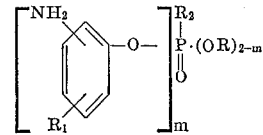

where the residues R are aryl radicals, $R_1$ represents a member of the group consisting of hydrogen atom and alkyl radical, $R_2$ is a member of the group consisting of aryl radical and aralkyl radical, and $m$ is an integer of at least 1 and at the most 2, (d) a reaction product of any of phosphoric acid esters (a), (b) and (c) with a member selected from the group consisting of carboxylic acid anhydride and alkylene oxide, with the proviso that reaction product (d) must have a residual content of at least one free primary amino group.

References Cited

UNITED STATES PATENTS 2,801,229   7/1957   De Hoff et al. _____ 260—47
3,013,049  12/1961   Holtschmidt et al. ____ 260—47

WILLIAM H. SHORT, *Primary Examiner.*

T. D. KERWIN, *Assistant Examiner.*

U.S. Cl. X.R.

260—2, 18, 33.2, 33.4, 37, 49, 59, 75, 78.4, 326, 830, 944; 117—21, 161; 161—184